United States Patent [19]
Reid

[11] Patent Number: 6,077,044
[45] Date of Patent: Jun. 20, 2000

[54] WELL PRODUCTION MANAGEMENT AND STORAGE SYSTEM

[76] Inventor: John A. Reid, 62 Linvale Rd., Ringoes, N.J. 08551

[21] Appl. No.: 09/028,594

[22] Filed: Feb. 23, 1998

[51] Int. Cl.[7] .............................. F04B 49/00; F04B 41/06
[52] U.S. Cl. .................................... 417/2; 417/12; 417/36
[58] Field of Search ............................. 417/2, 3, 12, 13, 417/36, 248

[56] References Cited

U.S. PATENT DOCUMENTS

| | | | |
|---|---|---|---|
| 2,239,612 | 4/1941 | Lawlor | 210/26 |
| 3,102,799 | 9/1963 | Kiekhaefer | 55/227 |
| 4,133,759 | 1/1979 | Ikeda et al. | 210/104 |
| 4,180,374 | 12/1979 | Bristow | 417/12 |
| 4,375,833 | 3/1983 | Meadows | 166/64 |
| 4,519,418 | 5/1985 | Fowler | 137/571 |
| 4,664,143 | 5/1987 | Thompson | 137/567 |
| 4,693,271 | 9/1987 | Hargrove et al. | 137/565 |
| 4,700,734 | 10/1987 | McCauley | 137/236.1 |
| 4,962,789 | 10/1990 | Benscoter | 137/571 |
| 5,129,415 | 7/1992 | Runyon et al. | 137/113 |
| 5,197,859 | 3/1993 | Siff | 417/19 |
| 5,577,890 | 11/1996 | Nielsen et al. | 417/44.2 |

OTHER PUBLICATIONS

Water System Control Panel by Tei, www.teicontrols.com/ws_conn.html, Jan. 1998.

*Primary Examiner*—Henry C. Yuen
*Assistant Examiner*—Mahmoud M. Gimie
*Attorney, Agent, or Firm*—Kenneth P. Glynn, Esq.

[57] ABSTRACT

A well pump storage and delivery assembly includes at least one collecting tank coupled to at least one source of water being derived from an underground well having a well pump therein. The collecting tank has an upper water level measuring member capable of detecting and measuring an upper level of water collected within the collecting tank and a lower water level measuring member capable of detecting and measuring a lower level of water collected within the collecting tank. A pressurization pump is connected to the collecting tank and is capable of receiving water therefrom. The pressurization pump is connected to a pressurized storage tank. A control panel is included and has a timer trigger for activating the well pump, a delay mechanism for governing the activation and de-activation of the well pump by a pre-selected time period, a regulating member for activating and deactivating the well pump incident to the detection of water in the well and a member for regulating the activation and deactivation of the pressurization pump.

20 Claims, 6 Drawing Sheets

WELL PRODUCTION MANAGEMENT AND STORAGE SYSTEM

BACKGROUND OF THE INVENTION

1. Field of the Invention

The present invention relates to well production management and storage systems and more particularly to well management systems which include at least one underground well, one separate collecting tank for use with a pressurization pump and an electrically powered control panel capable of managing and maintaining a constant supply of water in the collecting tank.

2. Information Disclosure Statement

The following patents describe the state of the art in well pumping systems.

U.S. Pat. No. 2,239,612 to Joseph P. Lawlor describes a raw water storage tank in an iron removal system having a water space, a compressed air space above the water level in the tank, means for admitting water and air into the tank, a repression tank having a water space and also having a compressed air space above the water level in that tank, a water-service line connected to the water space of the repression tank and having a back check valve, a filter, a pipe for conveying water from the water space of the raw water tank into the top of the filter, a pipe for conveying the filtered water from the filter into the water space of the repression tank, a back-wash line connected to the pipe which conveys the water from the raw water tank to the filter and having a shut-off valve, there being another shut-off valve in the pipe between the raw water tank and the place of connection therewith of the back-wash line, an air pressure equalizing line connecting the air space of the raw water tank with the air space of the repression tank, and a shut-off valve in the air pressure equalizing line.

U.S. Pat. No. 3,102,799 to Elmer Carl Kiekhaefer describes a water supply system for a residence with a water wheel, comprising, in combination, a narrow stand-pipe disposed adjacent the well and having an open top substantially higher than the roof of the residence, pump means connecting the well with the lower end of the stand-pipe for introduction of water into the latter, pressure-controlled switch means connecting the stand-pipe with the pump means so that the latter will be operated to maintain water in the stand-pipe between two desired levels closely adjacent to the top, a conduit disposed closely adjacent to the lower of the two levels and extending within the residence to supply water thereto, means to supply a cleansing gas to the bottom of the stand-pipe so that the gas will bubble up through the water and remove odors therefrom, a dome-shaped cap secured to the open top of the stand-pipe and having an annular filter disposed around the pipe so that gas escaping from the water will be discharged above the roof of the residence and impurities cannot be admitted to the water, the pump means including a conduit which discharges water into said stand-pipe at a point above the gas supplying means and upwardly to produce turbulence in the water so that any gas bubbles clinging to the wall of the stand-pipe will be released, means to operate the gas supplying means simultaneously with the pump means, and means to provide a timed continuation of operation of the gas supplying means after said pump means has ceased operating.

U.S. Pat. No. 4,519,418 to L. B. Fowler describes a water well pumping system for controlling the volume of fluid supplied to a supply reservoir from a primary reservoir and drawn off through an outlet conduit to the volume of fluid produced and pumped from the well. A fixed or variable resistance is interposed in piping between the primary and supply reservoir.

U.S. Pat. No. 4,693,271 to Benjamin F. Hargrove et al, describes a horizontally mounted submersible pump assembly for pumping water from water storage tanks, which pump assembly is characterized by a submersible pump mounted inside a horizontally orientated tube extending through the wall of the water storage tank. A valve is provided in cooperation with the immersed end of the tube to facilitate flow of water into the tube to the pump and the opposite, dry end of the tube is closed by an adapter flange mounted on a length of adapter pipe, one end of which extends into the tube and communicates with the discharge of the pump and the other end of which is flanged to a water distribution line. The water distribution line extends to a conventional pressure tank for distributing water to multiple users on demand. The submersible pump is typically of turbine design and is sized to quickly and effectively pressurize the water distribution system by pumping the water from the storage tank and the flooded tube to the pressure tank. The tube enclosing the pump facilities removal and replacement of the pump from the dry end of the tube without draining the storage tank.

U.S. Pat. No. 4,700,734 to Robert G. McCauley relates to water collecting and spring box and gauging system and water holding tank wherein the spring box is designed to receive and collect water from a source such as a spring. Once collected in the spring box, the water is filtered prior to being directed to a water holding tank that is normally stationed near a point between the spring and location of ultimate use. The spring box includes a water inlet, a drain, and a supply outlet. The flow rate of water from the spring box is controlled by varying the height of the water level maintained in the spring box and by selectively sizing and spacing openings formed in a vertical water filter that is communicatively connected to the supply outlet.

U.S. Pat. No. 4,962,789 to Kenneth Benscoter describes an emergency fresh water reservoir provided for a building for use in emergencies, such as earthquakes, floods, hurricanes and other natural disasters in which municipal water supplies are cut off or rendered impure or unpotable. The emergency water reservoir of the invention can also be used to provide a supply of water in times of man made disasters, such as war or acts of terrorism or vandalism which can render municipal water supplies suspect or unusable. The emergency water reservoir is connected between a municipal water supply line and a hot water heater for a building. Water passes through the emergency water reservoir before reaching the hot water heater. circulation of fresh water is assured and stagnancy of water is prevented during normal operation of municipal water supply due to a flow through the emergency water reservoir to replenish water in the hot water heater, as hot water is utilized in the building. In times of emergency water can be drawn directly from the emergency water supply.

U.S. Pat. No. 5,197,859 to Elliot J. Stiff describes a well pump system having a motor-driven pump and a pressure tank for delivering tie, water from a source to a utilization point. A sensing device detects a parameter correlated to the rate of flow onto and out of the pressure tank. The parameter is utilized to regulate flow into the tank so as to establish at least approximate equality between flow into and out of the tank.

Notwithstanding the above prior art, it is believed that the well production management and storage system, as set forth herein, is neither taught nor rendered obvious.

SUMMARY AND OBJECTS OF THE INVENTION

The present invention is a well pump storage and delivery assembly which includes at least one collecting tank coupled to at least one source of water being derived from an underground well having a well pump. The well pump is functionally connected to the water source so as to be capable of harvesting the water. The collecting tank is preferably translucent and non-pressurized. The collecting tank has an upper water level measuring member capable of detecting and measuring an upper level of water collected within the collecting tank and a lower water level measuring member capable of detecting and measuring a lower level of water collected within the collecting tank. A pressurization pump is connected to the collecting tank and is capable of receiving water therefrom and adding pressure thereto so as to permit delivery of pressurized water to any number of plumbing outlets. The pressurization pump is connected to a pressurized storage tank which is also capable of delivering pressurized water to any number of plumbing outlets. A control panel is included and has a timer trigger for activating the well pump, a delay mechanism for governing the activation and de-activation of the well pump by a pre-selected time period, a regulating member for activating and deactivating the well pump incident to the detection of water in the well and a member for regulating the activation and deactivation of the pressurization pump.

BRIEF DESCRIPTION OF THE DRAWINGS

The present invention should be more fully understood when the specification herein is taken in conjunction with the drawings appended thereto, wherein.

DETAILED DESCRIPTION OF THE PRESENT INVENTION

The present invention is a well pump storage and delivery assembly which includes at least one collecting tank coupled to at least one source of water being derived from an underground well having a well pump. The well pump is to be functionally connected to the water source so as to be capable of harvesting the water. The well pump may be functionally inundated in the well so as to harvest water directly, or may be any other well pump such as a jet pump. Thus, any existing well pump available within the art may be fitted with and connected to the present invention management assembly. The collecting tank is, preferably, translucent and is non-pressurized and may be any size or composition. The collecting tank may, be clear, opaque or otherwise. The collecting tank should, nonetheless, permit a user to visually monitor the level of water therein at any given time. Thus, an opaque collecting tank with an externally visible level indicator is well within the scope of the present invention. The visibly perceived water level indication from the collecting tank will permit a user to both monitor the amount of water in the collecting tank and to adjust his or her rate of use of water to be equal to the capacity of water yield therefrom. The collecting tank has an upper water level measuring member capable of detecting and measuring an upper level of water collected within the collecting tank and a lower water level measuring member capable of detecting and measuring a lower level of water collected within the collecting tank. A pressurization pump is connected to the collecting tank and is capable of receiving water therefrom and adding pressure thereto so as to permit delivery of pressurized water to any number of plumbing outlets. In the preferred embodiment, the pressurization pump is connected to a pressurized storage tank which is also capable of delivering pressurized water to any number of plumbing outlets. A water treatment unit such as a softener may also be added to the assembly. An electrically powered control panel is included and has a timer trigger for activating the well pump, a delay mechanism for governing the activation and de-activation of the well pump by a pre-selected time period, a regulating member for activating and deactivating the well pump incident to the detection of water in the well and a regulating member for regulating the activation and deactivation of the pressurization pump.

The present invention well management assembly is fully automatic and is capable of maintaining a constant supply of water available for a user by virtue of its continuously timed activation and deactivation cycles. In operation, the timer trigger activates or trips the well pump to begin pumping water at pre-set intervals. A delay member monitors the presence of water in the well for a pre-selected time period, i.e. one to six seconds. If no water is detected the well pump is immediately shut down and the timer tripper continues running its cycle until a specified interval elapses and the timer tripper re-activates the well pump. Thus, the integrity of the well pump is maintained so as to avoid burning out the well pump when water is not available in the well. If water is detected, the well pump continues to pump water for a pre-set period of time, e.g. 30 seconds, one minute, two minutes or otherwise. As the water flows from the well pump, a water flow relay switch is opened to permit the flow of water from the well pump to the collecting tank. Once the delay member has detected water and the well pump has been activated and the relay flow switch opened, the upper water level measuring member determines if the collecting tank has a level of water below capacity. If the water level is at peak capacity, the upper water level measuring member triggers the well pump to shut down. If the collecting tank is not at peak level, the well pump is permitted to run its full pumping cycle of, for example one minute, and then it is shut down. The timer trigger trip cycle is then repeated so as to maintain a constant peak capacity in the collecting tank. When a user consumes water, the level of water in the collecting tank begins to diminish. Thus, it is advantageous to utilize a collecting tank with some form of a visible level indication because a user can adjust his or her use of water to a rate well within the production capabilities of the well pump assembly.

Accordingly, water flows from the well pump to the collecting tank and then to a pressurization pump which adds pressure to the water. The pressurized water is then conveyed to a pressurization tank attached to the pressurization pump or, alternatively, delivered directly to any number of plumbing outlets. In the event that the water level in the collecting tank becomes hazardously low after extended use of water, the lower water level measuring member de-activates the pressurization pump in order to prevent the pressurization pump from losing its water prime and burning out. Consequently, the well pump is then permitted to refill the collecting tank to a safe level through a series of continuous timed cycles. As the water level in the collecting tank rises, the lower water level measuring member re-activates the pressurization pump and water is permitted to flow to plumbing outlets once again.

The present invention may use any size collecting tank. If, for example, a 165 gallon collecting tank is used and the well has a water production capacity of 4 gallons per minute, e.g. 240 gallons per hour, and the well pump is rated at 10 gallons per minute, the pump can pump for 24 minutes of each hour. Thus, with each successive cycle, only when water is detected in the well does the timed cycle run its full course and the production of water commence until the collecting tank is full. The size of the collecting tanks may be adjusted, e.g. up to 300 gallons per tank or more, and the pre-set frequency of the timer triggered cycles may be adjusted up or down as well. Thus, the present invention is infinitely adjustable to permit a water collection frequency for any setting whether commercial or domestic.

The specifics of the invention will be better understood when they are taken in conjunction with the Figures, as described in detail below.

Figure 1:
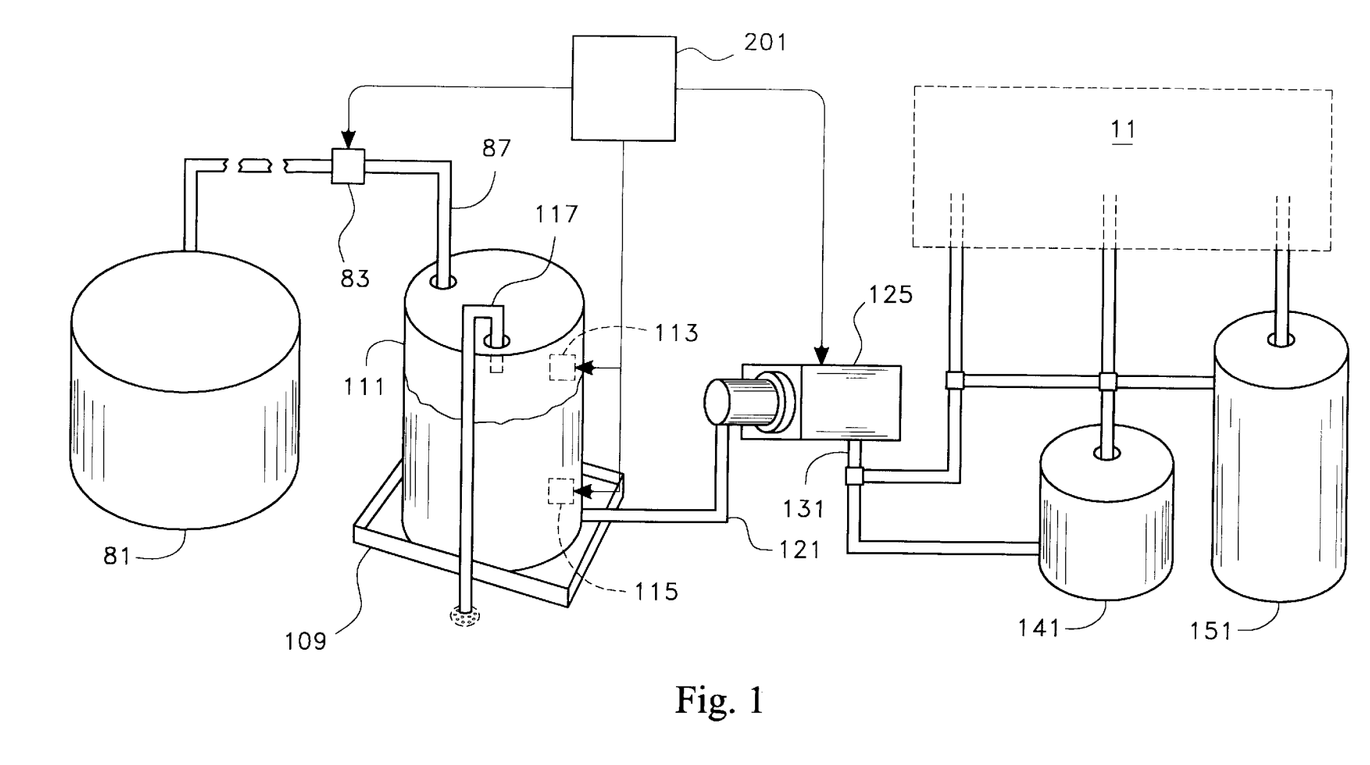
FIG. 1 shows a perspective view of a present invention well management system using a single well and a single collecting tank.
Figure 2:
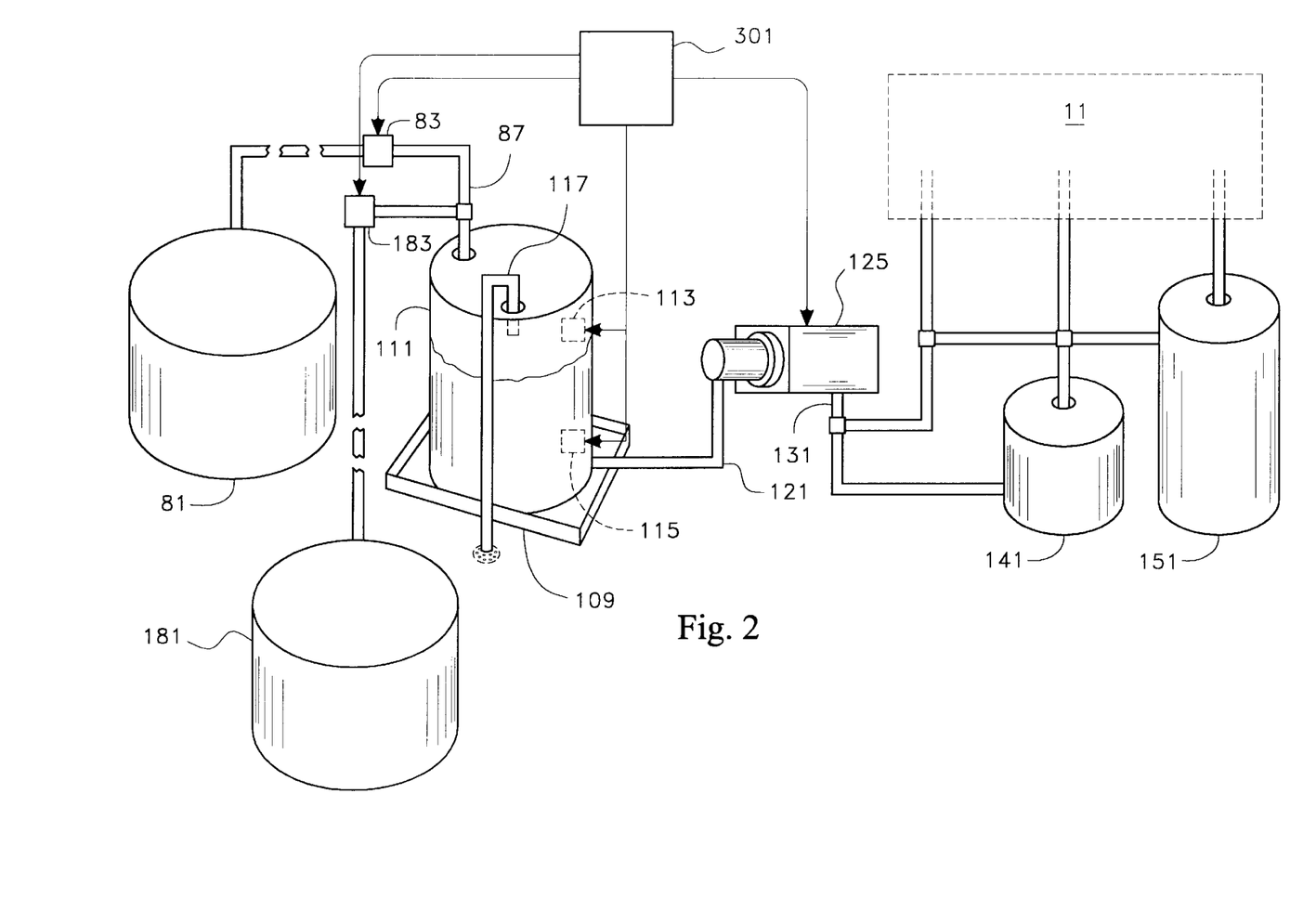
FIG. 2 shows a perspective view of a present invention well management system using a plurality of wells and a single collecting tank.

FIG. 1 shows a perspective view of a present invention well management system connected to a single well and having a single collecting tank. FIG. 2 shows a perspective view of a present invention well management system connected to a plurality of wells and having a single collecting tank. Identical elements are identically numbered for illustrative purposes. It should be understood that FIGS. 1 and 2 are merely illustrative and several modifications to the assembly as shown may be made without exceeding the scope of the present invention. Referring to FIGS. 1 and 2 wells 81 and 181 are connected to collecting tank 111 by flow means 87. While FIGS. 1 and 2 shown only one collecting tank, it should be understood that any number of collecting tanks may be utilized to increase the storage capacity of the present invention. As water flows through flow means 87 the water opens relay flow switches 83 and 183. While FIGS. 1 and 2 show the use of two relay flow switches, it should be understood that only one relay flow switch is necessary and could be used in combination with a check valve. Thus, if, for example, there were five wells, a single relay flow switch and five check valves could be used. Because well water may often be cool, collecting tank 111 includes condensation pan 109 which is capable of collecting run-off condensation for later discarding. Collecting tank 111 includes upper water level measuring member 113 and lower water level measuring member 115. Measuring members 113 and 115 may be any kind of level measuring members presently available, such as micro flow switches, steel float ball indicators or otherwise. Upper emergency overflow vent 117 is shown as a pvc to air conduit which permits water to escape in the event that upper measuring member 113 fails to operate. Vent 117 should optimally be channeled directly to a location where water run-off is permissible. Measuring members 113 and 115 are coupled to control panels 201, as shown in FIG. 1, and control panel 301, as shown in FIG. 2. Control panels 201 and 301 electrically monitor and control the production of water. Details of control panels 201 and 301 are addressed below with reference to FIGS. 3 through 6. As shown in FIGS. 1 and 2, flow means 121 connects pressurization pump 125 to collecting tank 111. Flow means 131 connects pressurization pump 125 to pressurization tank 141 and to water treatment unit 151, e.g. water softeners and the like, and to plumbing outlets 11, which may be any type of commercial or domestic plumbing outlet or fixture.

Figure 3:
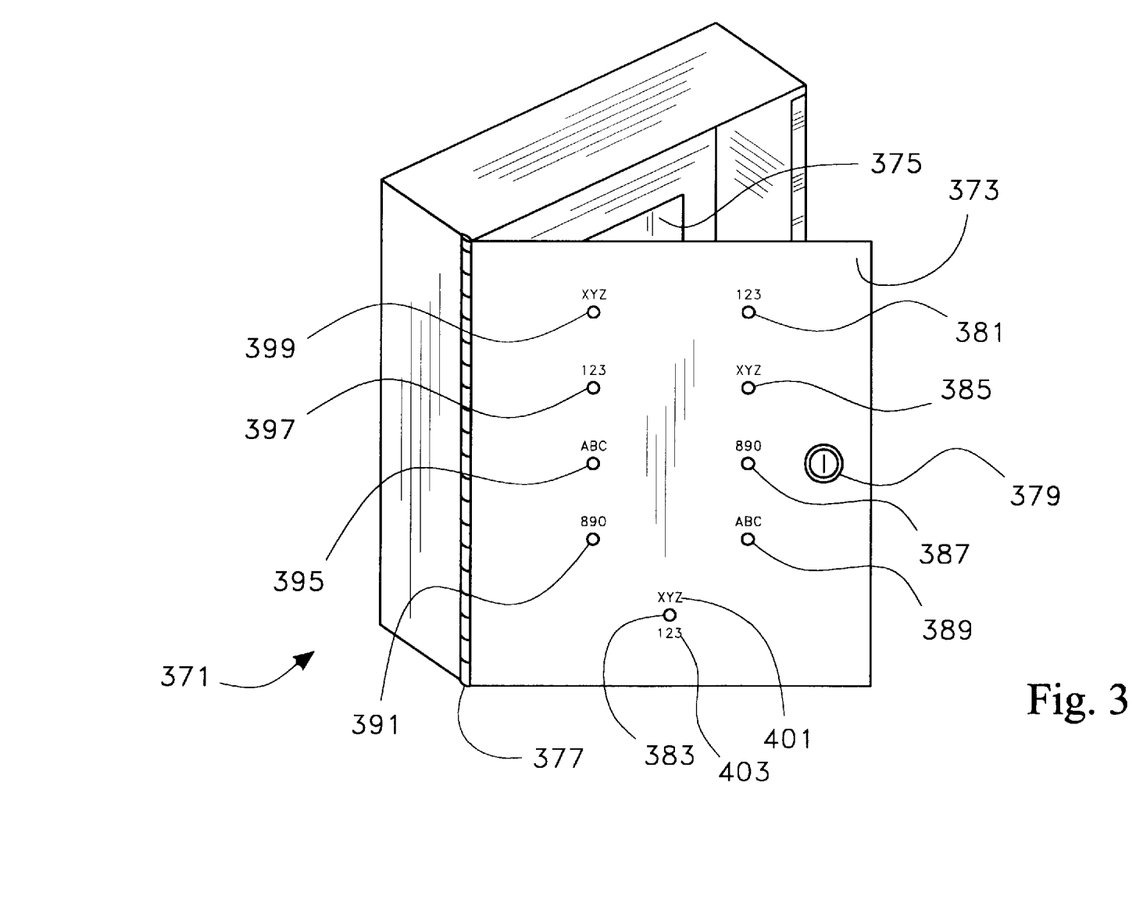
FIG. 3 shows a perspective view of a present invention control panel housing.

FIG. 3 shows a perspective view of a present invention control panel housing 371 which may be used to house control panels such as control panel 201 and 301. Here, housing 371 has a box-like shape with a hinged front cover 373. Cover 373 is hingably connected to housing 371 by hinge 377 and includes lock 379. Face plate 375 is fastened to the inside of housing 371 and serves as a mooring for control panel components located inside housing 371. Cover 373 has a plurality of light bulb terminals for providing a user with measurements, information and details of the function and performance of the present invention well management assembly. Light terminals 381, 383, 385, 387, 389, 391, 395, 397 and 399, for instance, each provide lighted signals which convey conditions present while the present invention is in use. Indicia such as marks 401 and 403 may be used as labels to function concurrently with the light bulb terminals. For example, when the unit is in use, light bulb terminal 383 could be illuminated to convey such status. Indicia such as 403 could be designed to read "IN USE" or "110 VOLT POWER ON," "220 VOLT POWER ON," or otherwise. Likewise, other light terminals could be used to convey messages such as, "WELL PUMP 1 ON," "WELL PUMP 2 ON," "TIMER ON," "TANK FULL," "TANK EMPTY PLEASE WAIT," "FLOW FROM WELL OK" and so on. Accordingly, housing 371 may comprise any number of shapes or dimensions and the specific light terminal construction and indicia variety and location may vary greatly without exceeding the scope of the present invention.

Figure 4:
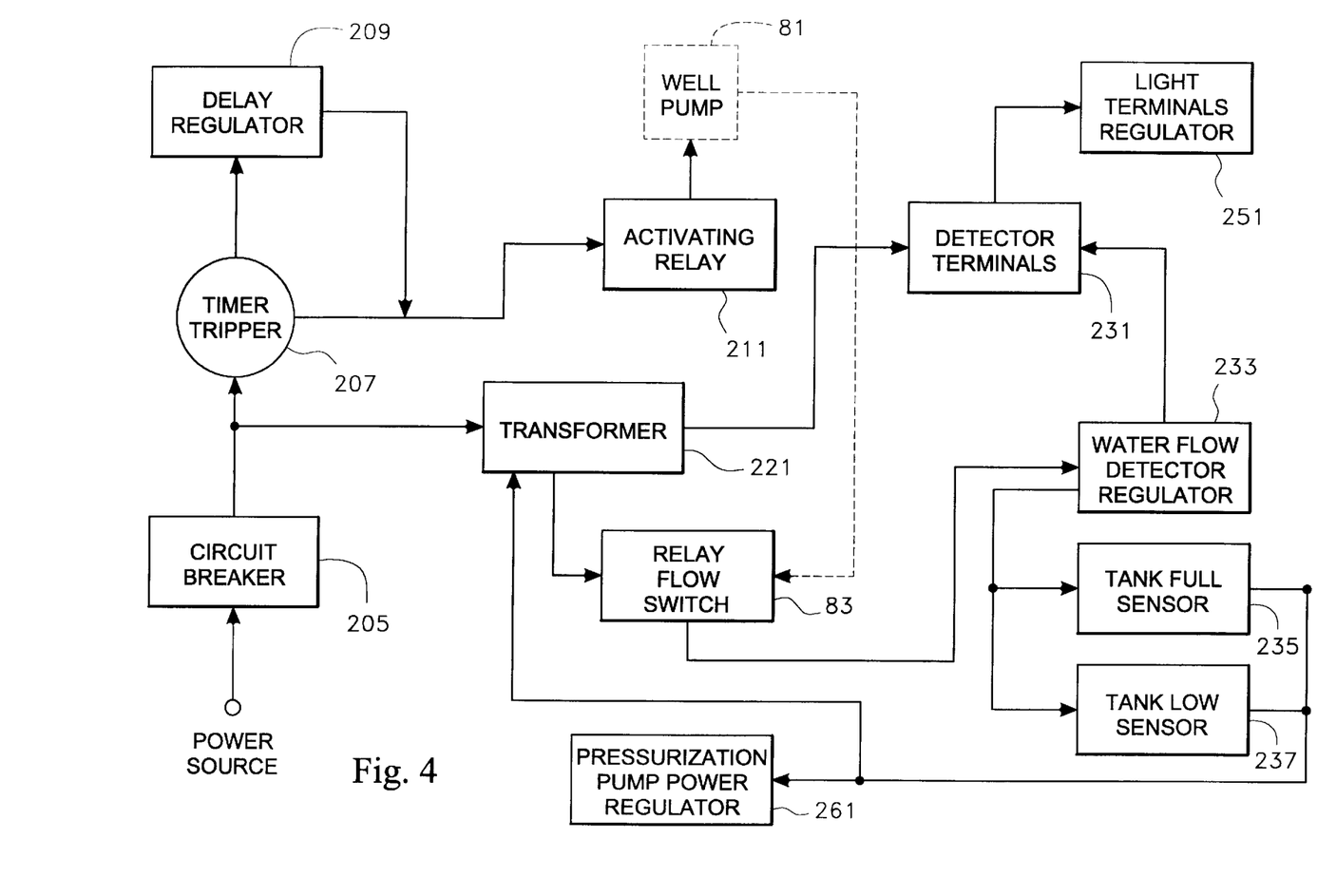
FIG. 4 shows a block diagram schematic of a present invention well management system using a single well pump.

FIG. 4 shows a sample block diagram schematic of a present invention well management system using a single well pump and shows details of control panel components which function with other elements of the present invention as previously disclosed. Identical parts are identically numbered for illustrative purposes. Here, a power source is fed through conventional circuit breaker 205 to timer tripper 207. Typically, the power source is rated at 110 volts per well pump. Timer tripper 207, as shown, may be any type of conventional electric power tripping device without exceeding the scope of the present invention, as such timing devices are well known throughout the art. Once timer tripper 207 triggers, delay regulator 209 is activated. Delay regulator 209 activates relay 211 which then permits well pump 81, which is independently powered, to begin pumping water. If no water is detected within a pre-selected delay period, i.e. 1 to 6 seconds, delay regulator 209 terminates well pump activity until another timed interval cycle occurs and timer tripper 207 triggers activation once again. If water is present in the well, well pump 81 generates a flow of water which causes relay flow switch 83 to close thereby sending a flow signal to control panel detector terminals 231. Transformer 221 converts the high voltage power into low voltage power so as to provide low voltage power to the low voltage switches, regulators and sensors as shown. Specifically, as shown here water flow detector regulator 233 detects the flow of water and light terminals regulator 251 prompt an appropriate light bulb terminal to illuminate. Tank full sensor 235 is coupled to upper measuring member 113. If the collecting tank is at peak capacity, the flow of water is terminated and the well pump is shut down until the next cycle. Tank low sensor 237 is, likewise, coupled to lower measuring member 115. If the water level in the collecting tank is dangerously low, pressurization pump power regulator 261 deactivates the pressurization pump in order to maintain the water prime and to prevent a burn out. Once the water level in the collecting tank reaches a safe level and or peak level, the pressurization pump is re-activated.

Figure 5:
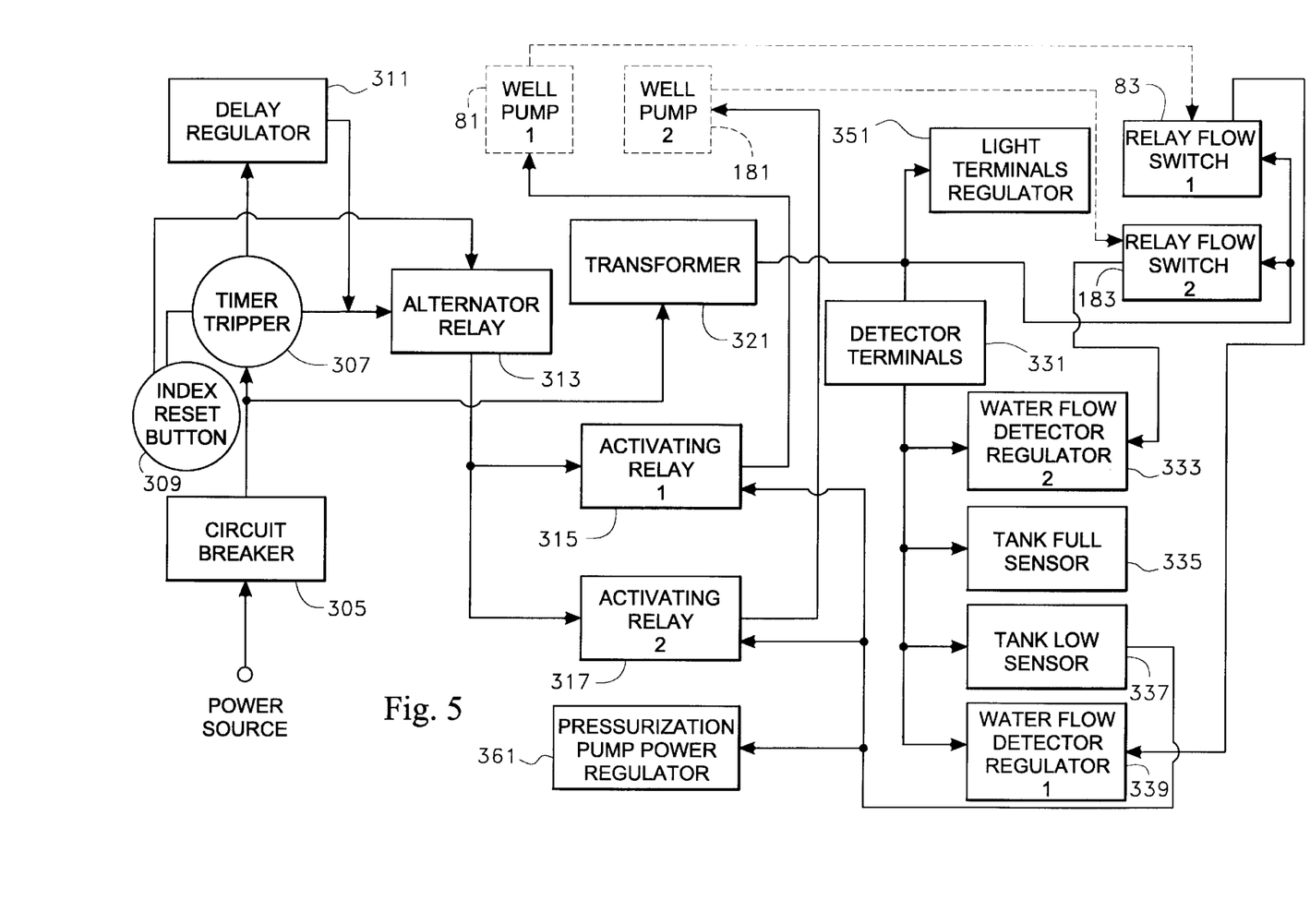
FIG. 5 shows a block diagram schematic of a present invention well management system using a plurality of well pumps.

FIG. 5 shows an alternative sample block diagram schematic of a present invention well management system using a plurality of well pumps and shows details of control panel components which function with other previously disclosed elements of the present invention in this alternative embodiment. Identical parts are identically numbered for illustrative purposes. Here, a power source is fed through conventional circuit breaker 305 to timer tripper 307. Once timer tripper 307 triggers, delay regulator 311 is activated. Delay regulator 311 actuates alternator relay 313. Alternator relay 313 may be any conventional alternator capable of alternating power between a plurality of well pumps. In other words, alternator relay 313 is capable of oscillating the functional operation of well pumps 81 and 181 so as to equalize well usage and, when necessary, to promote greater water production if, for example, one well is less productive than another well. Thus, alternator relay 313 is coupled to activating relays 315 and 317 which permit well pumps 81 and 181 respectively to begin pumping water. If no water is detected within a pre-selected delay period, i.e. 1 to 6 seconds, delay regulator 311 terminates the operative well pump activity until another timed interval cycle occurs and timer tripper 307 triggers activation once again. While two wells are shown here, any number of wells may be used without exceeding the scope of the present invention. If water is present, well pumps 81 and 181 alternately generate a flow of water which causes relay flow switches 83 and 183 to close thereby sending a flow signal to control panel detector terminals 331. Transformer 321 converts the high voltage power into low voltage power so as to provide low voltage power to the low voltage switches, regulators and sensors as shown. Specifically, as shown here water flow detector regulators 333 and 339 detect the flow of water and light terminals regulator 351 thereby prompts an appropriate light bulb terminal to illuminate. Tank full sensor 335 is coupled to upper measuring member 113. If the collecting tank is at peak capacity, the flow of water is terminated and the well pump is shut down until the next cycle. Tank low sensor 337 is likewise coupled to lower measuring member 115. If the water level in the collecting tank is dangerously low, pressurization pump power regulator 361 deactivates the pressurization pump in order to maintain the water prime and to prevent a burn out. Once the water level in the collecting tank reaches a safe and/or peak level, the pressurization pump is re-activated and water is freely accessible. Timer tripper 307 may be fitted with visual trigger indicators, e.g. color coded members which correspond with alternate well pumps. In the event of a power failure, index reset button 309 may be manually triggered so as to reset the correct alternate well pump activation so as to properly correspond with the trigger indicators, if desired.

Figure 6:
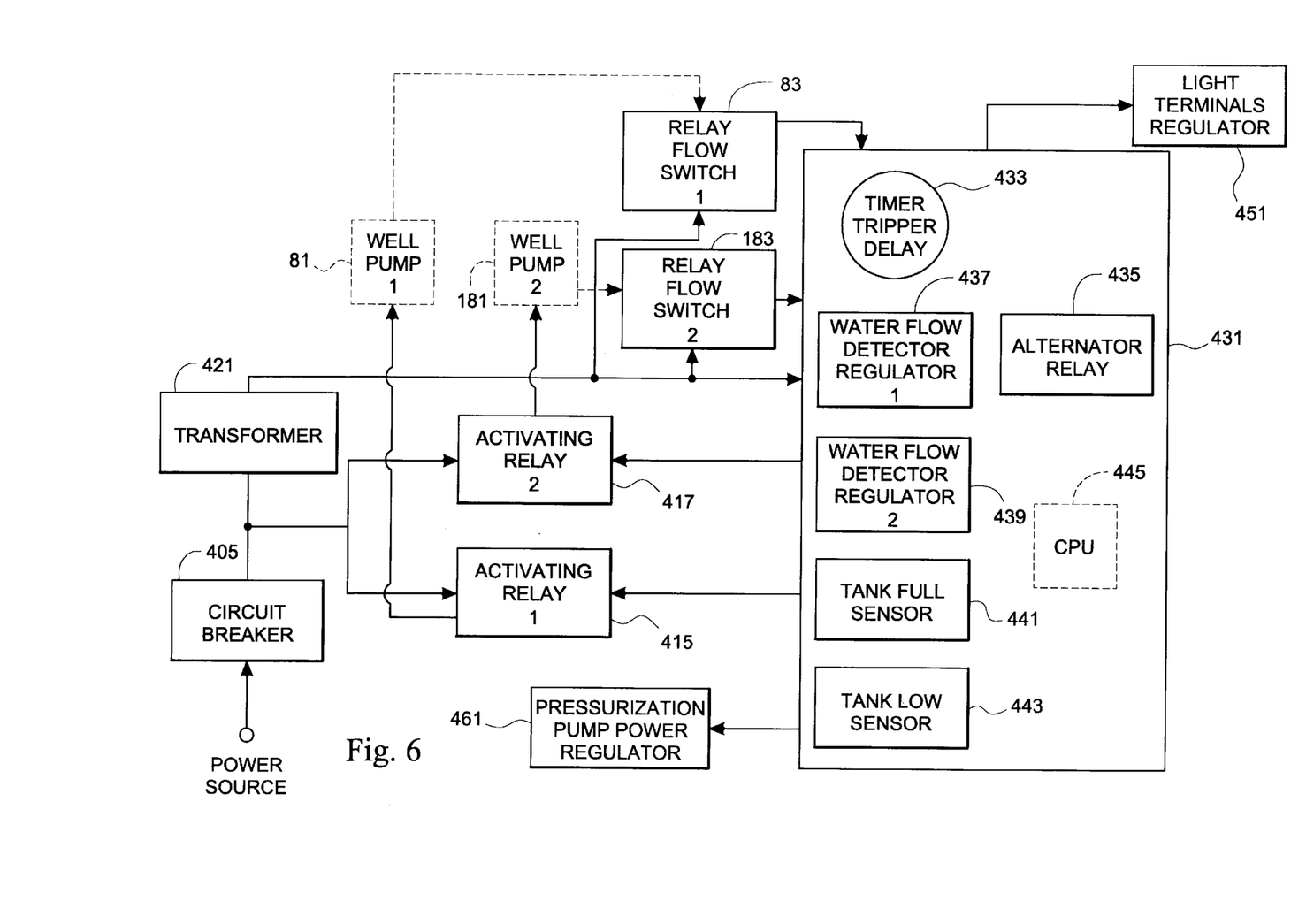
FIG. 6 shows another block diagram schematic of a present invention well management system using a plurality of well pumps and using a printed circuit board.

FIG. 6 shows another alternative sample block diagram schematic of a present invention well management system using a plurality of well pumps and using a printed circuit board and shows details of control panel components which function with previously disclosed elements of the present invention. Identical parts are identically numbered for illustrative purposes. Here, a power source is fed through conventional circuit breaker 405. Transformer 421 converts the high voltage power into low voltage power so as to provide low voltage power to the low voltage switches, regulators and sensors as shown. Transformer 421 provides power to printed circuit board 431. Printed circuit board 431 may comprise any number of elements so as to simplify and augment the performance of the present invention. As shown here, printed circuit board 431 comprises element 433 which functions as a timer tripper and delay regulator. Once element 433 triggers, it activates a delay signal and then actuates alternator relay element 435. Alternator relay element 435 is coupled to both activating relays 415 and 417 which permit well pumps 81 and 181 respectively to begin pumping water alternately. If no water is detected within a pre-selected delay period, i.e. 1 to 6 seconds, element 433 terminates the operative well pump activity until another timed interval cycle occurs and element 433 triggers activation once again. If water is present in a well, well pumps 81 and 181 alternately generate a flow of water which causes relay flow switches 83 and 183 to close thereby sending a flow signal to control panel circuit board 431. Specifically, as shown here, water flow detector regulator elements 437 and 439 detect the flow of water and light terminals regulator 451 thereby prompts an appropriate light bulb terminal to illuminate. Tank full sensor element 441 is coupled to upper measuring member 113. If the collecting tank is at peak capacity, the flow of water is terminated and the well pump is shut down until the next cycle. Tank low sensor element 443 is likewise coupled to lower measuring member 115. If the water level in the collecting tank is dangerously low, pressurization pump power regulator 461 deactivates the pressurization pump in order to maintain the water prime and to prevent a burn out. Once water level in the collecting tank reaches a safe and/or peak level, the pressurization pump is re-activated and water is freely accessible. To further enhance the performance of printed circuit board 431, CPU 445 may be added. CPU 445 may be configured to control and monitor all aspects of the present invention.

It should be understood that FIGS. 1 through 6, as shown, are merely illustrative. The exact number, size and construction of the collecting tanks, for example, may vary greatly within the scope of the present invention. The size, location and exact configuration of the control panel may likewise greatly vary without exceeding the scope of the present invention.

Obviously, numerous modifications and variations of the present invention are possible in light of the above teachings. It is therefore understood that within the scope of the appended claims, the invention may be practiced otherwise than as specifically described herein.

What is claimed is:

1. A well pump water storage and delivery assembly comprising:
   (a) at least one non-pressurized collecting tank, said collecting tank being coupled to a source of water, said source of water being derived from an underground well having a well pump, said well pump being functionally connected to said water source wherein said well pump is capable of harvesting said water source and delivering said water source to said collecting tank, said well pump having means for communicatably coupling said well pump to a control panel, said collecting tank having means for connecting said collecting tank to a pressurization pump wherein said collection tank connecting means is capable of conveying water therethrough, said collecting tank including:
      upper water level measuring means, said upper water level measuring means being functionally located inside said collecting tank such that said upper measuring means is capable of detecting and measuring an upper level of water collected within said collecting tank and wherein said upper water level measuring means is capable of being communicatably coupled to a control panel; and lower water level measuring means, said lower water level measuring means being functionally located inside said collecting tank such that said lower measuring means is capable of detecting and measuring a lower level of water collected within said collecting tank and wherein said lower water level measuring means is capable of being communicatably coupled to a control panel;

(b) a pressurization pump, said pressurization pump being connected to said collecting tank connection means such that said pressurization pump is capable of receiving water from said collecting tank and dispensing pressure thereto, said pressurization pump having means for communicatably coupling said pressurization pump to a control panel, said pressurization pump having means for conveying pressurized water to a pressurized storage tank, said pressurization pump also having means for conveying pressurized water directly to at least one plumbing outlet;

(c) a pressurized storage tank, said pressurized storage tank being connected to said pressurization pump conveying means such that said pressurized storage tank is capable of receiving and storing water conveyed from said pressurization pump, said pressurized storage tank having means for conveying pressurized water directly to at least one plumbing outlet; and (d) a control panel, said control panel having means for connecting said control panel to a power source, said control panel including:

timer trigger means for activating said well pump;

means for regulating the activation and deactivation of said well pump wherein said well pump regulator means is coupled to said upper water level measuring means and said lower water level measuring means;

means for detecting the presence of water in said well, said water detecting means being communicatably coupled to said well pump activation and deactivation means; and means for regulating the activation and deactivation of said pressurization pump wherein said pressurization pump regulator means is coupled to said lower water level measuring means.

2. The well pump water storage and delivery assembly of claim 1 wherein said collecting tank is translucent.

3. The well pump water storage and delivery assembly of claim 1 wherein said control panel includes a delay mechanism, said delay mechanism being capable of deactivating said well pump after a pre-determined time period if water is not detected within said well.

4. The well pump water storage and delivery assembly of claim 1 wherein said well pump assembly includes a water treatment unit.

5. The well pump water storage and delivery assembly of claim 1 wherein said collecting tank includes an additional upper measuring means, said additional upper measuring means being capable of activation if said upper measuring means fails to operate.

6. The well pump water storage and delivery assembly of claim 3 wherein said control panel includes a printed circuit board, said printed circuit board being capable of functioning in place of at least said timer trigger means and said delay mechanism.

7. The well pump water storage and delivery assembly of claim 1 wherein said well pump assembly includes two collecting tanks.

8. A well pump water storage and delivery assembly comprising:

(a) at least one non-pressurized collecting tank, said collecting tank being coupled to a plurality of sources of water, said sources of water being derived from a plurality of underground wells, each of said wells having a well pump, each of said well pumps being functionally connected to said water sources wherein each of said well pumps is capable of harvesting a water source and delivering said water source to said collecting tank, each of said well pumps having means for communicatably coupling said well pumps to a control panel, said collecting tank having means for connecting said collecting tank to a pressurization pump wherein said collection tank connecting means is capable of conveying water therethrough, said collecting tank including:

upper water level measuring means, said upper water level measuring means being functionally located inside said collecting tank such that said upper measuring means is capable of detecting and measuring an upper level of water collected within said collecting tank and wherein said upper water level measuring means is capable of being communicatably coupled to a control panel; and lower water level measuring means, said lower water level measuring means being functionally located inside said collecting tank such that said lower measuring means is capable of detecting and measuring a lower level of water collected within said collecting tank and wherein said lower water level measuring means is capable of being communicatably coupled to a control panel;

(b) a pressurization pump, said pressurization pump being connected to said collecting tank connection means such that said pressurization pump is capable of receiving water from said collecting tank and dispensing pressure thereto, said pressurization pump having means for communicatably coupling said pressurization pump to a control panel, said pressurization pump having means for conveying pressurized water to a pressurized storage tank, said pressurization pump also having means for conveying pressurized water directly to at least one plumbing outlet;

(c) a pressurized storage tank, said pressurized storage tank being connected to said pressurization pump conveying means such that said pressurized storage tank is capable of receiving and storing water conveyed from said pressurization pump, said pressurized storage tank having means for conveying pressurized water directly to at least one plumbing outlet; and (d) a control panel, said control panel having means for connecting said control panel to a power source, said control panel including:

timer trigger means for activating said well pumps;

means for regulating the activation and deactivation of said well pumps wherein said well pump regulator means is coupled to said upper water level measuring means and said lower water level measuring means;

alternator means for selectively alternating power between well pumps wherein each of said well pumps is activated in a pre-determined order, said alternator means being communicatably coupled to said means for regulating the activation and deactivation of said well pumps;

means for detecting the presence of water in each of said wells, said water detecting means being communicatably coupled to said well pump activation and deactivation means; and means for regulating the activation and deactivation of said pressurization pump wherein said pressurization pump regulator means is coupled to said lower water level measuring means.

9. The well pump water storage and delivery assembly of claim 8 wherein said collecting tank is translucent.

10. The well pump water storage and delivery assembly of claim 8 wherein said control panel includes a delay mechanism, said delay mechanism being capable of deactivating each of said well pumps after a pre-determined time period if water is not detected within said wells.

11. The well pump water storage and delivery assembly of claim 8 wherein said well pump assembly includes a water treatment unit.

12. The well pump water storage and delivery assembly of claim 8 wherein said collecting tank includes an additional upper measuring means, said additional upper measuring means being capable of activation if said upper measuring means fails to operate.

13. The well pump water storage and delivery assembly of claim 8 wherein said timer trigger means includes an index reset button, said index reset button being capable of permitting manual alternating of power between well pumps to reset a pre-determined order of alternating power in response to a power failure, said index reset button being communicatably coupled to said means for regulating the activation and deactivation of said well pumps and said alternator means.

14. The well pump water storage and delivery assembly of claim 10 wherein said control panel includes a printed circuit board, said printed circuit board being capable of functioning in place of at least said timer trigger means, said alternator means, and said delay mechanism.

15. The well pump water storage and delivery assembly of claim 8 wherein said well pump assembly includes two collecting tanks.

16. A well pump water storage and delivery assembly comprising:

(a) at least one non-pressurized collecting tank, said collecting tank being coupled to a source of water, said source of water being derived from an underground well having a well pump, said well pump being functionally connected to said water source wherein said well pump is capable of harvesting said water source and delivering said water source to said collecting tank, said well pump having means for communicatably coupling said well pump to a control panel, said collecting tank having means for connecting said collecting tank to a pressurization pump wherein said collection tank connecting means is capable of conveying water therethrough, said collecting tank including:

upper water level measuring means, said upper water level measuring means being functionally located on said collecting tank such that said upper measuring means is capable of detecting and measuring an upper level of water collected within said collecting tank and wherein said upper water level measuring means is capable of being communicatably coupled to a control panel; and lower water level measuring means, said lower water level measuring means being functionally located on said collecting tank such that said lower measuring means is capable of detecting and measuring a lower level of water collected within said collecting tank and wherein said lower water level measuring means is capable of being communicatably coupled to a control panel;

(b) a pressurization pump, said pressurization pump being connected to said collecting tank connection means such that said pressurization pump is capable of receiving water from said collecting tank and dispensing pressure thereto, said pressurization pump having means for communicatably coupling said pressurization pump to a control panel, said pressurization pump having means for conveying pressurized water to a pressurized storage tank, said pressurization pump also having means for conveying pressurized water directly to at least one plumbing outlet;

(c) a pressurized storage tank, said pressurized storage tank being connected to said pressurization pump conveying means such that said pressurized storage tank is capable of receiving and storing water conveyed from said pressurization pump, said pressurized storage tank having means for conveying pressurized water directly to at least one plumbing outlet; and (d) a control panel, said control panel having means for connecting said control panel to a power source, said control panel including:

timer trigger means for activating said well pump;

means for regulating the activation and deactivation of said well pump wherein said well pump regulator means is coupled to said upper water level measuring means and said lower water level measuring means;

means for detecting the presence of water in said well, said water detecting means being communicatably coupled to said well pump activation and deactivation means;

a delay mechanism, said delay mechanism being capable of deactivating said well pump after a pre-determined time period if water is not detected within said well; and means for regulating the activation and deactivation of said pressurization pump wherein said pressurization pump regulator means is coupled to said lower water level measuring means.

17. The well pump water storage and delivery assembly of claim 16 wherein said collecting tank includes a condensation collecting pan.

18. The well pump water storage and delivery assembly of claim 16 wherein said collecting tank includes an additional upper measuring means, said additional upper measuring means being capable of activation if said upper measuring means fails to operate.

19. The well pump water storage and delivery assembly of claim 16 wherein said control panel includes a printed circuit board, said printed circuit board being capable of functioning in place of said timer trigger means and said delay mechanism.

20. The well pump water storage and delivery assembly of claim 16 wherein said printed circuit board includes a CPU element.

* * * * *